United States Patent
Toda (10) Patent No.: US 8,149,163 B2
(45) Date of Patent: Apr. 3, 2012

(54) GPS COMPOUND NAVIGATION DEVICE

(75) Inventor: Hiroyuki Toda, San Francisco, CA (US)

(73) Assignee: Furuno Electric Company Limited, Nishinomiya-shi (JP)

( * ) Notice: Subject to any disclaimer, the term of this patent is extended or adjusted under 35 U.S.C. 154(b) by 169 days.

(21) Appl. No.: 12/532,395

(22) PCT Filed: Nov. 26, 2007

(86) PCT No.: PCT/JP2007/072717
§ 371 (c)(1),
(2), (4) Date: Mar. 25, 2010

(87) PCT Pub. No.: WO2008/117493
PCT Pub. Date: Oct. 2, 2008

(65) Prior Publication Data
US 2010/0283670 A1 Nov. 11, 2010

(30) Foreign Application Priority Data
Mar. 22, 2007 (JP) ................ 2007-073827

(51) Int. Cl.
*G01S 19/22* (2010.01)
*G01S 19/08* (2010.01)
*G01S 19/20* (2010.01)
*G01S 19/21* (2010.01)
*G01S 19/47* (2010.01)

(52) U.S. Cl. ........... 342/357.61; 342/357.3; 342/357.45; 342/357.58; 342/357.59

(58) Field of Classification Search ............. 342/357.3, 342/357.28, 357.45, 357.58, 357.59, 357.61, 342/357.32
See application file for complete search history.

(56) References Cited

U.S. PATENT DOCUMENTS

| 5,906,655 | A | 5/1999 | Fan |
| 5,917,445 | A | 6/1999 | Schipper et al. |
| 6,167,347 | A | 12/2000 | Lin |

(Continued)

FOREIGN PATENT DOCUMENTS

GB 2323989 A 10/1998

(Continued)

OTHER PUBLICATIONS

Internatinal Search Report of PCT/JP2007/072717 maild on Mar. 4, 2008.

(Continued)

*Primary Examiner* — Thomas Tarcza
*Assistant Examiner* — Fred H Mull
(74) *Attorney, Agent, or Firm* — Nutter McClennen & Fish LLP; John J. Penny, Jr.; Christina M. Sperry (57) ABSTRACT

To provide a GPS compound device having a configuration including a GPS receiver, that accurately determines abnormality in an output from the GPS receiver based on a difference between a GPS pseudorange measurement and a Doppler frequency measurement, when detecting the abnormality in the outputs from the GPS receiver, while avoiding continuation of the abnormality at the time of the abnormality determination resulting from estimation errors of the GPS pseudorange measurement and the Doppler frequency measurement. When the abnormality of the outputs from the GPS receiver are detected, an abnormal period is counted. When the count value is below a predetermined threshold, the outputs from the GPS receiver are treated as abnormal, and after it exceeded the threshold, the outputs from the GPS receiver are treated as normal. Thus, the abnormality of the outputs from the GPS receiver can be determined accurately.

6 Claims, 5 Drawing Sheets

U.S. PATENT DOCUMENTS

| | | |
|---|---|---|
| 6,240,367 B1 | 5/2001 | Lin |
| 6,246,960 B1 | 6/2001 | Lin |
| 6,292,750 B1 | 9/2001 | Lin |
| 6,311,129 B1 | 10/2001 | Lin |
| 6,408,245 B1 | 6/2002 | An et al. |
| 6,480,152 B2 | 11/2002 | Lin et al. |
| 6,697,736 B2 | 2/2004 | Lin |

FOREIGN PATENT DOCUMENTS

| | | |
|---|---|---|
| JP | 6-341847 A | 12/1994 |
| JP | 2001-281321 A | 10/2001 |
| JP | 2003-057327 A | 2/2003 |
| JP | 2003-167043 A | 6/2003 |
| JP | 2004-069536 A | 3/2004 |
| JP | 2004-150922 A | 5/2004 |
| JP | 2004-301725 A | 10/2004 |
| JP | 2006-046911 A | 2/2006 |

OTHER PUBLICATIONS

Masato Kawai, Shigeki Hara, Osamu Arai, Furuno Electric Co., Ltd. A New Step Detector Algorithm for GPS/SBAS Receiver, ION GPS 2001, pp. 2571-2578.

European Search Report of European App. No. 07832442.3 mailed on Jan. 28, 2011.

GPS COMPOUND NAVIGATION DEVICE

TECHNICAL FIELD

The present invention relates to a GPS compound navigation device that measures a position, a velocity, an azimuth, and the like of a moving body, and more specifically to the GPS compound navigation device that detects abnormality of output from a GPS receiver and performs processing appropriate at the time of occurrence of the abnormality.

BACKGROUND

GPS/INS integrated systems, which are integration of a GPS receiver and inertial sensors and calculate positions, velocities of a moving body, can calculate more robust and highly accurate positions and velocities by integrating outputs from the GPS receiver and outputs from the inertial sensors.

The outputs from the GPS receiver includes pseudorange measurements and Doppler frequency measurements generated by the GPS receiver (hereinafter, referred to as "GPS measurements"), positions, and velocities (hereinafter, referred to as "GPS positions," "GPS velocities," respectively) calculated based on ephemeris data or the like.

In order to obtain reliable outputs from the GPS receiver, it is necessary to detect the existence of normality or abnormality of the GPS measurements, and eliminate the abnormal value. Typically, although the GPS receiver eliminates the abnormal GPS measurements based on the normality/abnormality determination of the received GPS signals, they are unable to be eliminated completely in actual cases.

Therefore, it is necessary to determine the abnormality in the outputs from the GPS receiver as well as for the outside of the GPS receiver. The conventional methods of the abnormality determination includes a method based on a difference between a pseudorange calculated from a PN code and it estimated value as disclosed in the Patent Document 1, a method based on a difference between a GPS position and a position obtained from an external device as described in the Patent Document 2, and a method based on a difference between a pseudorange calculated from a PN code and a distance calculated from a carrier phase as described in the Patent Document 3, etc.

Because the method described in the Patent Document 2 requires the external support devices other than GPS, it will be expensive and their applications may be restricted. The method as described in the Patent Document 3 is effective in detection where, for example, the detection is more strongly influenced with one of the signs of multipath errors. However, the methods of detecting the abnormality by a difference will loose their advantages when influenced by reversed polarity due to, such as ionosphere errors or when there are errors which receive the same kind of influences.

The method of the Patent Document 1 is a well-used technique, as seen in the Receiver Autonomous Integrity Monitoring (RAIM) technique.
[Patent Document 1] Masato Kawai, Shigeki Hara, and Osamu Arai, "A New Step Detector Algorithm For GPS/SBAS Receiver" ION GPS 2001, 14th International Technical Meeting of the Satellite Division of the Institute of Navigation, Sep. 11-14, 2001
[Patent Document 1] JP2004-301725(A)
[Patent Document 2] U.S. Pat. No. 5,917,445

SUMMARY

Problem to be Solved by the Invention

However, in any of the methods describe above, methods of determining the abnormality by the difference between the GPS measurements or GPS positions and the estimated values thereof are based on the assumption in which the estimation errors of the GPS measurements or the GPS positions can be ignored. If this assumption is not fulfilled, the outputs from the GPS receiver will be determined to be abnormal even though they are normal. As a result, there is a disadvantage in which it cannot escape from a loop for determining abnormality unless the factors of the estimation errors of the GPS measurements or the GPS positions are eliminated. The following is described taking the case of the method of determining abnormality by the difference between the GPS pseudorange measurements and/or the GPS Doppler frequency measurements.

When obtaining the estimated values of the GPS measurements, particularly based on integrated positions or integrated velocities of the moving body in the traveling direction obtained from an integration processor using a low-cost and low-performance inertial sensor, estimation errors of the integrated positions and the integrated velocities in the traveling direction of the moving body as the outputs from the integration processor will be large. Therefore, the probability of the condition in which the system cannot escape from the loop for determining the abnormality will be higher.

The present invention is made in view of the conditions described above, and solves the disadvantages in which the system cannot escape from the abnormality determination loop resulting from the estimation errors of the GPS measurements by the conventional technique and, thus, reduces the probability of determining the abnormal GPS measurements being normal.

Means for Solving Problem

In order to solve the conditions, an aspect of the present invention provides a GPS compound device including an integration processor for calculating an integrated position, an integrated velocity, and an integrated azimuth of a moving body, an error estimator for estimating at least a velocity error and an azimuth error of the outputs from the integration processor based on at least an output from the GPS receiver and the outputs from the integration processor, and a GPS abnormality detector for detecting an abnormality of the output from the GPS receiver based on a comparison difference between a pseudorange measurement and/or a Doppler frequency measurement of the output from the GPS receiver and an estimated value of the GPS measurement.

When the abnormality is detected by the GPS abnormality detector, an abnormal period is counted. When the count value is below a predetermined threshold, the output from the GPS receiver is treated as abnormal. After exceeding the threshold, the output from the GPS receiver is forcibly treated as normal.

According to this configuration, the erroneous abnormality determination of the output from the GPS receiver originated in the estimation error in the estimated value of the GPS measurement can be eliminated.

In the aspect of the invention, the GPS abnormality detector may further include a GPS reliability determination module for determining a reliability of the output from the GPS receiver using any of an S/N, C/No, and DOP (dilution of precision) values of the received GPS signals obtained from the outputs of the GPS receiver. When the GPS reliability determination module determines as non-reliable, the count of the abnormal period may be stopped or reset.

By this configuration, after the count value of the abnormal period exceeds the threshold, a probability of erroneously determining the truly abnormal GPS measurements being normal can be reduced.

In the aspect of the invention, the detection of abnormality by the GPS abnormality detector may be performed based on, instead of the pseudorange measurement and/or the Doppler frequency measurement, a difference between the position and/or the velocity of the output from the GPS receiver and the position and/or the velocity of the output from the integration processor.

In the aspect of the invention, the integration processor may calculate the integrated position, the integrated velocity, and the integrated azimuth of the moving body based on at least the GPS position, an output from an accelerometer for measuring at least an acceleration of the moving body in the traveling direction, and an output from a gyro sensor for measuring at least a rotation rate about an azimuth axis of the moving body.

In the aspect of the invention, the integration processor may calculate the integrated position, the integrated velocity, and the integrated azimuth of the moving body based on outputs from a velocity sensor for measuring at least a velocity of the moving body in the traveling direction and a gyro sensor for measuring at least a rotation about the azimuth axis of the moving body.

In the aspect of the invention, the system may further include a memory module for storing at least the integrated position and the integrated velocity from the integration processor immediately before a power-off. The data stored in the memory module may be used as an initial value of the calculation by the integration processor at the time of a power-on. By this configuration, even when the initial value cannot be obtained from the output of the GPS receiver at the time of power-on, because the initial value can be obtained from the output of the memory module, the output from the integration processor can be provided in the early stage.

ADVANTAGEOUS EFFECTS OF INVENTION

According to the aspect of the present invention, the abnormality in the output from the GPS receiver can be detected using a low-cost and minimum-configuration the inertial sensor. In addition, the condition originated from the abnormality in the estimated value of the GPS measurement, in which the system cannot escape from an abnormality determination loop when the output from the GPS receiver is determined to be abnormal even if it is normal, can be solved.

In addition, according to the aspect of the present invention, by adding the GPS reliability determination module for determining the reliability of the output from the GPS receiver using the reliability index prior to the abnormality determination by the GPS measurement difference, the probability to erroneously determine the truly abnormal GPS measurement to be normal after the count of the abnormal period can be reduced.

DESCRIPTION OF REFERENCE NUMERALS

1 GPS antenna
2 GPS receiver
3 Inertial sensor
4 Velocity sensor
5 GPS/INS integration processor
51 Integration processor
52 GPS abnormality detector
53 Error estimator

DETAILED DESCRIPTION

Embodiment 1

Figure 1:
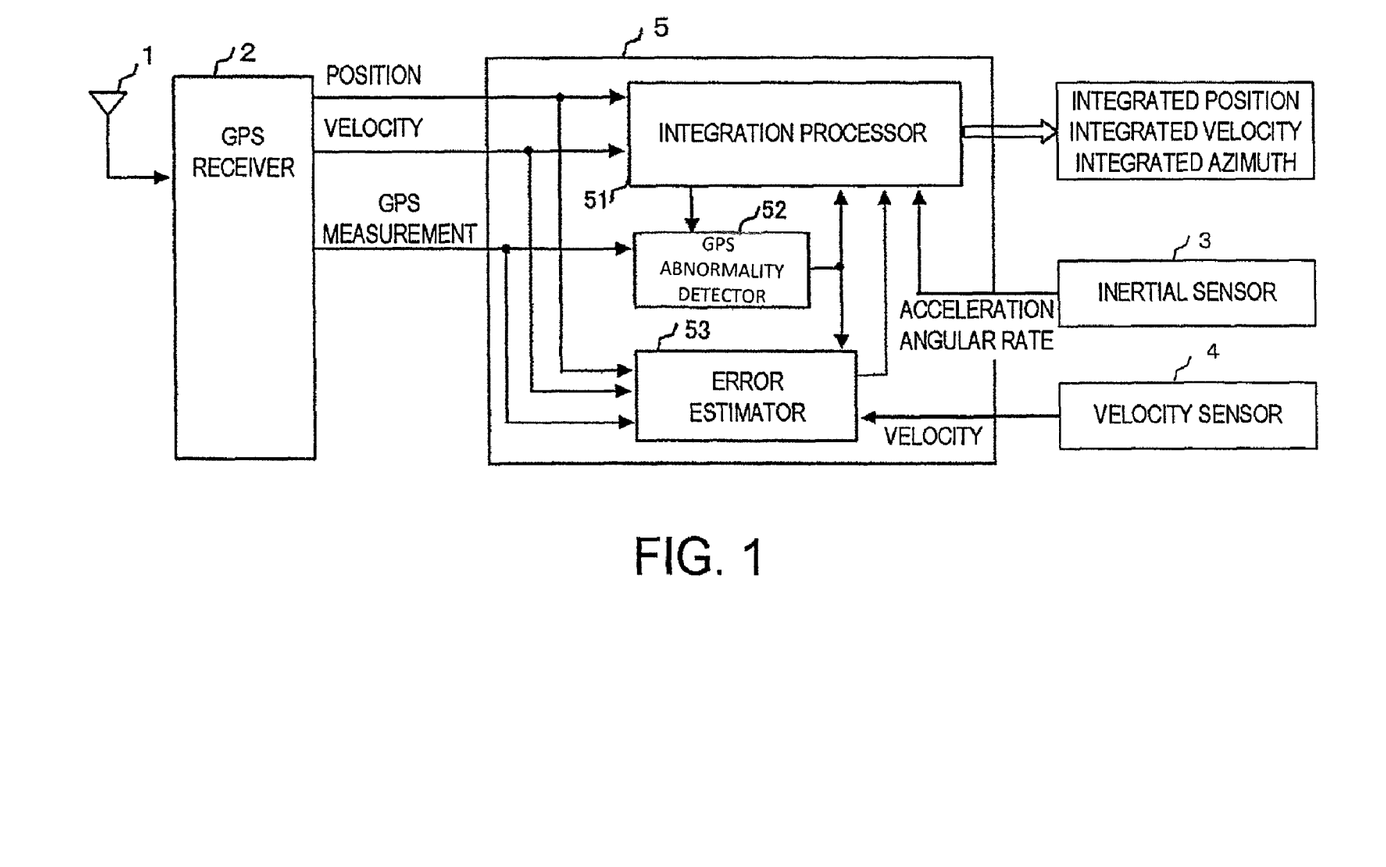
FIG. 1 is a diagram illustrating a configuration example 1 of a GPS compound device of GPS/INS integrated system according to the present invention.

FIG. 1 shows a functional configuration of a GPS compound device according to Embodiment 1 of the invention. An antenna 1 receives GPS satellite signals from a plurality of GPS satellites. In response to the received signals from the antenna 1, a GPS receiver 2 calculates GPS measurements between the satellites and the antenna 1, then calculates a GPS position and a GPS velocity, and GPS measurements, ephemeris data, GPS times and the like based on the calculated GPS measurements, and then outputs them to a GPS/INS integration processor 5.

Meanwhile, outputs from an inertial sensor 3 constituted with an accelerometer for measuring an acceleration of a moving body in its traveling direction and a gyro sensor for measuring an angular rate of the vertical traveling component of the moving body, a velocity sensor 4 for measuring a velocity of the moving body in the traveling direction, and the like are transmitted to the GPS/INS integration processor 5.

An integration processor 51 integrates the following Equations 1 to 3 based on the GPS position, the acceleration measurement, and the angular rate measurement obtained from the inertial sensor 3 to calculate, for example, an integrated position in the local geodetic frame (latitude, longitude, and height). In addition, the integration processor 51 integrates Equations 5 and 6 to calculate an integrated velocity of the moving body in the traveling direction and an integrated azimuth with respect to the north direction. In addition, the integration processor 51 calculates an integrated velocity in the local geodetic frame using the integrated velocity and the integrated azimuth of the moving body in the traveling direction.

Initial values of the position and velocity required for the integration calculation of Equations 1 to 3 can be obtained from the GPS position and the GPS velocity. In addition, an initial value of the azimuth can be obtained from the horizontal velocity component of the GPS velocity. As described later, an initial value of the integrated azimuth may not necessarily be needed if azimuth errors are estimated and corrected by an error estimator 53.

Alternatively, if the integrated position, the integrated velocity, and the integrated azimuth immediately before a power-off of the system are stored, these stored data may be used as the initial values of the integration calculation of Equations 1 to 3 at the time of a power-on. A dynamic equation of the position of the moving body (i.e., latitude, longitude, and height) can be expressed by Equations 1 to 3, respectively.

$$\frac{d\phi}{dt} = \frac{v_N}{r_m + h} + w_n \quad (1)$$

$$\frac{d\lambda}{dt} = \frac{V_E}{(r_p + h)\cos\phi} + W_e \quad (2)$$

$$\frac{dh}{dt} = v_D + w_h \quad (3)$$

$$v_N = v_x \cos\psi \quad (4)$$
$$v_E = v_x \sin\psi$$
$$v_D = -v_x \sin\theta$$
$$r_p = \frac{r_e}{\sqrt{1 - e^2 \sin^2\phi}}$$
$$r_m = \frac{r_p(1 - e^2)}{1 - e^2 \sin^2\phi}$$

Here, $\phi$, $\lambda$, and h are the latitude, longitude, and height, respectively. Here, $v_N$, $v_E$, and $v_D$, are the integrated velocity of the north-direction component in the local geodetic frame, the integrated velocity of the east-direction component, and the integrated velocity of the vertical component, respectively. Here, $w_n$, $w_e$, and $w_h$ are model errors for the integrated velocity, respectively. Although $\psi$ is the integrated azimuth and $\theta$ is a pitch, and they can be calculated from the GPS velocity, for example; the pitch $\theta$ may be approximated by zero when the pitch angle is small. Here, $\omega_e$, $r_e$, and e are the earth rate, the Earth's equatorial radius, and the ellipsoidal eccentricity of the earth, respectively. The dynamic equation of the integrated velocity and the integrated azimuth of the moving body in the traveling direction are calculated based on Equations 5 and 6, respectively.

$$\frac{dv_x}{dt} = a_x + w_{ax} \quad (5)$$

Here, $a_x$ is the measurement of the accelerometer, and $w_a$ is its error.

$$\frac{d\Psi}{dt} = \omega_z + w_\omega \quad (6)$$

Here, $\omega_z$ is the measurement of the gyro sensor, and $w_\omega$ is its error.

A GPS abnormality detector 52 detects the existence of the abnormality in the outputs from the GPS receiver 2, and it is a processing module for resolving the condition in which the system cannot escape from an abnormality determination loop at the time of occurrence of the abnormality.

In the GPS abnormality detector 52, an estimated value (i) of the GPS measurement between an i satellite and the moving body is calculated based on ephemeris data (a position and a velocity of the i satellite) obtained from the outputs from the GPS receiver 2, and the integrated position and the integrated velocity of the outputs from the integration processor 51.

The estimated value (i) of the GPS measurement is compared with the GPS measurement (i) of the outputs from the GPS receiver 2, and a GPS measurement difference (i) is then calculated. When the GPS measurement difference (i) is greater than a predetermined threshold, the outputs from the GPS receiver 2 is detected to be abnormal. Note that, when the GPS measurement difference (i) is equal to the threshold, it may be detected to be abnormal or normal.

When the abnormality is detected by the GPS abnormality detector 52, in order to count an abnormal period of the $i^{th}$ GPS measurement (i) (i=0, 1, . . . , N), an abnormal residual counter (i) starts the count when the GPS abnormality detector 52 detects the abnormality. When the count value is below a predetermined threshold, the outputs from the GPS receiver 2 are treated as abnormal, and after exceeding the count value, the outputs from the GPS receiver 2 are treated as normal.

The error estimator 53 estimates an error of Equation 7 based on the dynamic equations of Equations 1 to 3 and Equations 5 to 6, and a measurement equation of Equation 8 described below using, for example, the least squares or Kalman filter.

$$x = [\delta\phi \ \delta\lambda \ \delta h \ \delta v_x \ \delta\psi \ \delta a_x \ \delta\omega_z]^T \quad (7)$$

Here, $\delta\phi$, $\delta\lambda$, and $\delta h$ are a latitude error, a longitude error, and a height error, respectively. Here, $\delta v_x$ and $\delta\psi$ are a velocity error and an azimuth error of the moving body in the traveling direction, respectively, and $\delta a_x$ and $\delta\omega_z$ are a bias error of the outputs from the accelerometer and a bias error of the outputs from the gyro sensor, respectively.

$$Y = Hx + v \quad (8)$$

Here, v is a measurement noise. A measurement vector Y is as follows.

$$Y = \begin{bmatrix} y_{i\_\rho} \\ y_{i\_\phi} \\ y_{vx} \end{bmatrix} \quad (9)$$

A measurement matrix H can be calculated using the output from the integration processor 51 and the output from the GPS receiver 2. Here, $y_{i\_\rho}$ is a difference between the $i^{th}$ pseudorange measurement (i) and the estimated pseudorange measurement (i). Here, $y_{i\_\phi}$ is a difference between the $i^{th}$ Doppler frequency measurement (i) and the estimated Doppler frequency measurement (i). Here, $y_{vx}$ is a difference between the measurement from the velocity sensor 4 and the integrated velocity of the moving body in the traveling direction estimated by the integration processor 51. Note that the measurement of the velocity sensor 4 may be substituted by the GPS velocity instead.

Here, an estimated value (i)$\rho_{i\_est}$ of the $i^{th}$ GPS pseudorange measurement and an estimated value (i)$f_{i\_est}$ of the Doppler frequency measurement are calculated by Equations 10 and 11, respectively.

$$\rho_{i\_est} = |p_{e\_est} - p_{e\_i\_sv}| \quad (10)$$

$$f_{i\_est} = H_e \times v_{e\_est} - \frac{\rho_{i\_est}(t) - \rho_{i\_est}(t - \Delta t)}{\Delta t} \quad (11)$$

Here, $p_{e\_est}$ is an integrated position of the moving body in the Earth-Centered, Earth-Fixed (ECEF) frame, and it can be calculated by a known method from the integrated position derived in the local geodetic frame. Here, $p_{e\_i\_sv}$ is a position of the i satellite in the ECEF frame and is known from the ephemeris data. Here, $H_e$ is a direction cosine of a reference satellite and the i satellite seen from the position of the moving body in the ECEF frame.

Note that Equations 10 and 11 may not be limited to the measurement model between the i satellite and the moving body, and may be replaced by an equation corresponding to a single phase difference measurement model formed between the i satellite and the reference satellite, and the moving body. An estimated value $v_{e\_est}$ of the integrated velocity of the moving body in the traveling direction is an estimated velocity value of the moving body in the ECEF frame, and can be found by Equation 12.

$$v_{e\_est} = C_{ge}\begin{bmatrix} v_N \\ v_E \\ v_D \end{bmatrix} = C_{ge}\begin{bmatrix} v_x \cos\psi \\ v_x \sin\psi \\ -v_x \sin\theta \end{bmatrix} \quad (12)$$

Here, Cge is a conversion matrix from the local geodetic frame to the ECEF frame, and can be calculated using the integrated position. When the pitch angle of the moving body is small, the pitch angle θ may be approximated by zero.

The position error estimated by the error estimator 53, the velocity error of the moving body in the traveling direction, the azimuth error, and the inertial sensor error are corrected every time the outputs from the GPS receiver 2 are updated in their cycle. Further, in the error estimator 53, the measurement vector Y of Equation 9 may be substituted by Equation 13, and the error estimator 53 may estimate the errors described above.

$$Y = \begin{bmatrix} y_p \\ y_v \\ y_{vx} \end{bmatrix} \quad (13)$$

Here, $y_p$ is a difference between the integrated position and the GPS position, $y_v$ is a difference between the integrated velocity and the GPS velocity, and $y_{vx}$ is a difference between the measurement of the velocity sensor 4 and the integrated velocity of the moving body.

Figure 2:
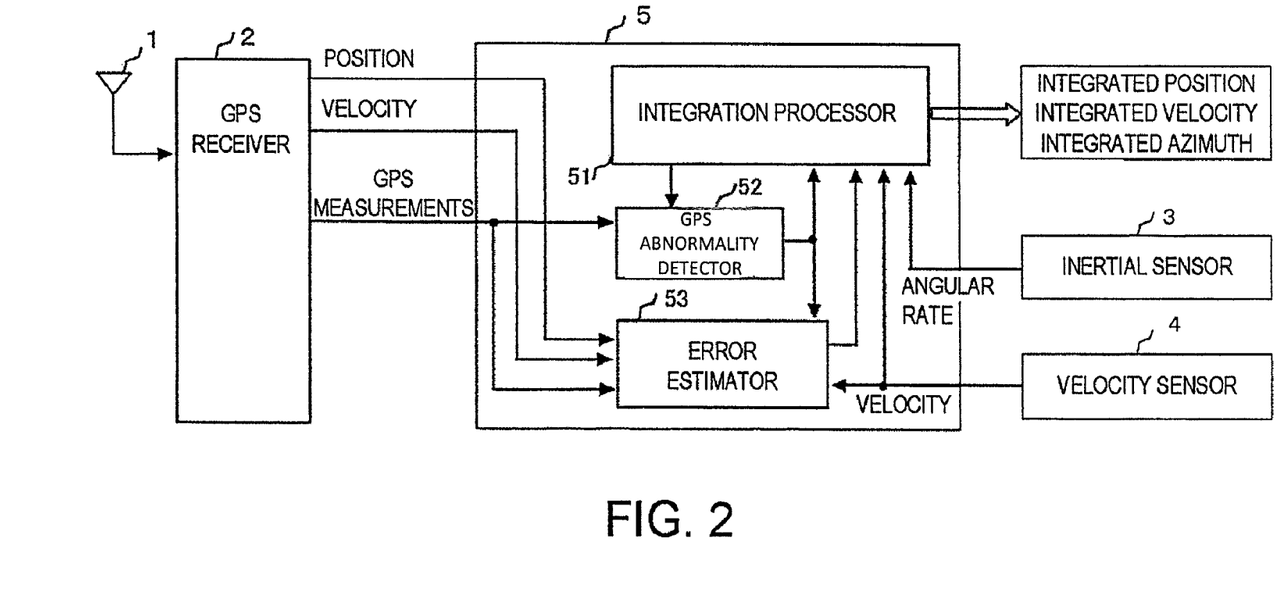
FIG. 2 is a diagram illustrating a configuration example 2 of the GPS compound device of GPS/INS integrated system according to the present invention.

The present invention may also be applied to a configuration shown in FIG. 2. The difference of the configuration of FIG. 2 from the configuration of FIG. 1 is that the calculation processing of the integration processor 51 is performed using the output from the gyro sensor and the output from the velocity sensor 4. In the configuration of FIG. 2, Equation 5 is not necessary, and the GPS velocity can be directly substituted by the velocity obtained from the velocity sensor 4. In this case, $\delta a_x$ of Equation 7 may be deleted or substituted by the velocity sensor error. Also in the configuration of FIG. 2, initial values required for the calculation in the integration processor 51 may be the same method as the method explained with the configuration of FIG. 1.

Figure 3:
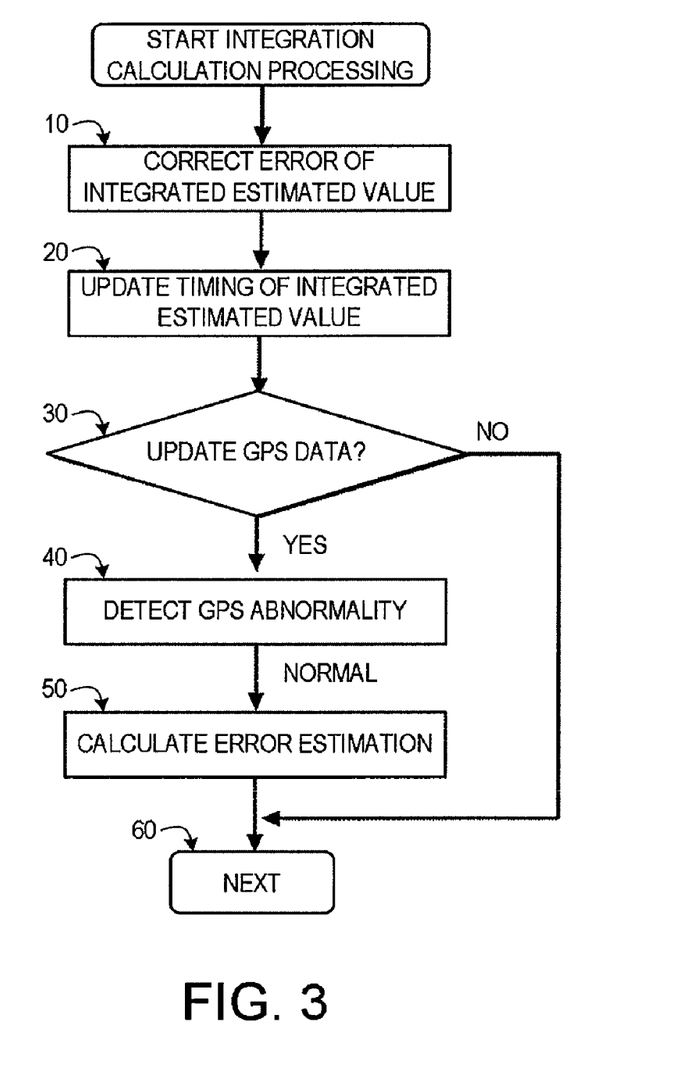
FIG. 3 is a diagram illustrating a process flow of the GPS/INS integration processor according to the present invention.

FIG. 3 shows a process flow of the GPS/INS integration processor 5 having the configuration of FIG. 1. Because this process flow is the same for the configuration of FIG. 2, the explanation will be omitted for FIG. 2 except for the case where there are particular differences. In Step 10 of FIG. 3, an error estimated by the error estimator 53 is corrected.

In Step 20, the calculation processing of the integration processor 51 is performed based on the outputs from the GPS receiver 2, and the outputs from the inertial sensor 3 and the output from the velocity sensor 4, read at predetermined cycles, respectively.

Here, the predetermined cycle of the outputs from the GPS receiver 2 is a cycle at which the output from the GPS receiver 2 are updated (normally, 1 sec. to 0.02 sec.), and the outputs from the inertial sensor 3 are updated at a cycle or shorter than the updating cycle of the outputs from the GPS receiver 2.

Note that, although the output from the velocity sensor 4 may be the same as the updating cycle of the outputs from the GPS receiver 2 in the case of the configuration of FIG. 1, it may be the same as the reading cycle of the outputs from the inertial sensor 3 in the case of the configuration of FIG. 2.

In Step 30, it is determined that the update timing of the outputs from the GPS receiver 2 is reached. If it reached the update timing, it goes to Step 40 which is a processing step of the GPS abnormality detector 52 to perform the processing of the GPS abnormal detection for the entire channel number i. Then, the calculation processing of the error estimator 53 is performed in Step 50.

If a period during which the minimum number of normal GPS measurements required for the estimation of the error cannot be obtained exceeds a predetermined period, an appropriate processing may be performed, such as a stop of the correction of the estimation errors of the estimated values such as the integrated position and the integrated velocity in Step 10, a stop of the timing update (measurement update) of the estimated values such as the integrated position and the integrated velocity in Step 20.

Figure 4:
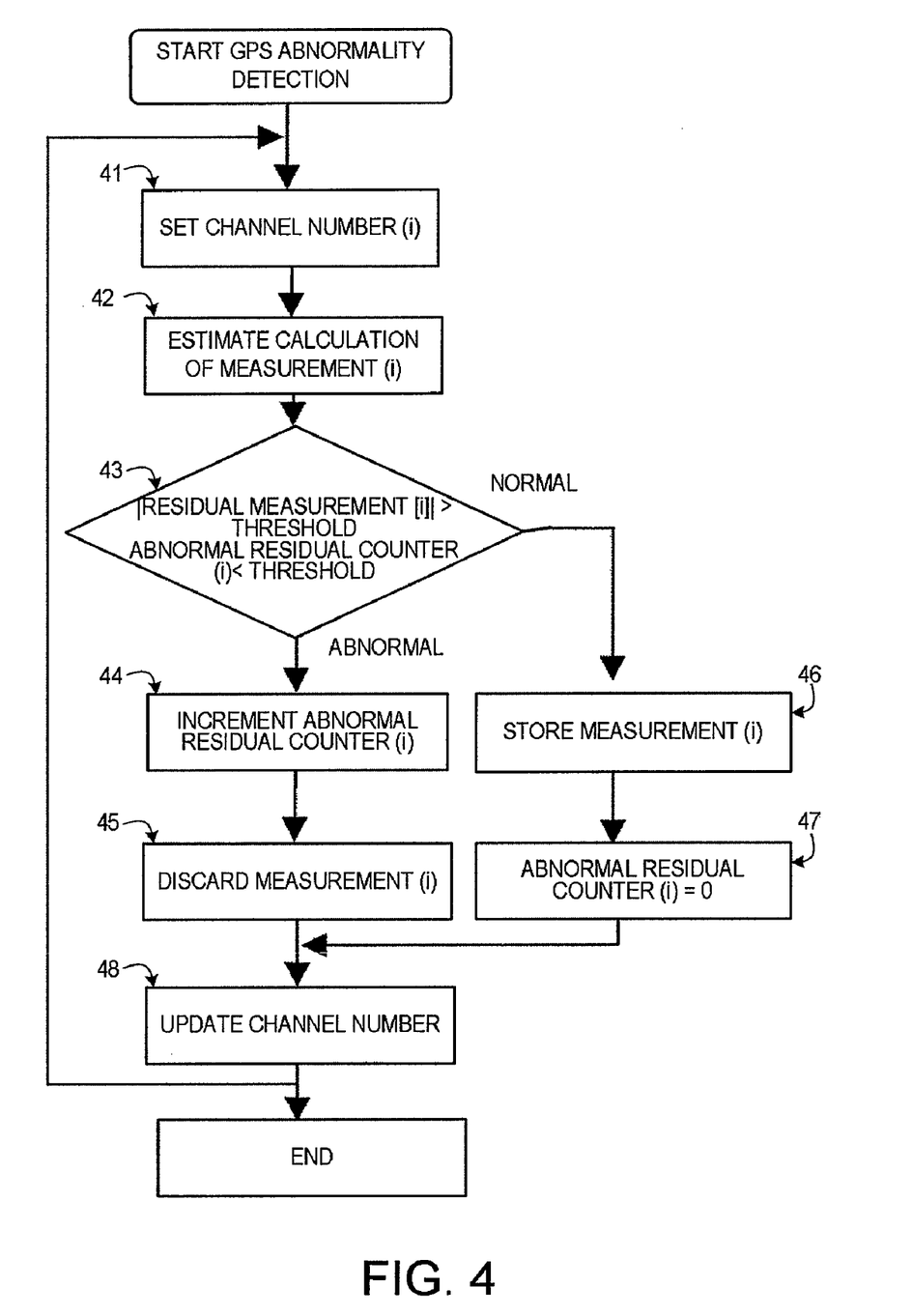
FIG. 4 is a diagram illustrating a process flow of Embodiment 1 according to an abnormal detection/determination of the present invention.

FIG. 4 shows a detailed process flow of Step 40 in FIG. 3. In Step 41 of FIG. 4, among all the channels which can be measured by the GPS receiver 2, channel(s) i (=1, 2, 3 . . . ) for which abnormality of the GPS measurement is to be determined is set. After that, in Step 42, the estimated value (i) of the GPS measurement for the channel number i is calculated.

In Step 43, for every selected channel number i, the abnormal detection of the GPS measurement (i) is performed based on the determination by the GPS measurement difference (i) and the determination by the abnormal residual counter (i).

The determination of the GPS measurement difference (i) is determined based on Equation 14.

$$|\rho_{i\_mes} - \rho_{i\_est}| > \text{threshold} \quad (14)$$
$$|f_{i\_mes} - f_{i\_est}| > \text{threshold}$$

Here, $\rho_{i\_mes}$ and $f_{i\_est}$ are the pseudorange measurement (i) and the Doppler frequency measurement (i), respectively.

The determination of abnormality of the GPS measurement (i) is carried out by comparing the abnormal residual counter (i) value with a predetermined threshold, as shown in Equation 15.

$$\text{abnormal residual counter}(i) < \text{threshold} \quad (15)$$

The threshold for the determination by the GPS measurement difference (i) and the threshold for the determination by the abnormal residual counter (i) are set independently from each other. The threshold for the determination by the GPS measurement difference (i) and the threshold for the abnormal residual counter (i) may be uniquely set for every channel number i. Further, In Equation 14, although the determinations of the pseudorange measurement difference (i) and the Doppler frequency measurement difference (i) are performed independently, the determinations may be performed using either one of the pseudorange measurement difference (i) and the Doppler frequency measurement difference (i), or may be performed using the both. Equations 14 and 15 may be equations including equal signs.

As described above, the abnormality of the GPS measurement (i) originated from the estimation errors in the estimated value (i) of the GPS measurement will continue unless the causes of the estimation error are eliminated. On the other hand, the abnormality of the GPS measurement (i) generated by the factors such as degradation of the received signals, multipath, cycle slips normally have a high probability to return to normal conditions relatively in a short time. Therefore, if the set count (i.e., the threshold) is set to an appropriate value, the probability in which the abnormal GPS measurement (i) is deemed to be normal can be reduced substantially to the extent without problems.

In Step 43, if determined to be abnormal, it goes to Step 44, and the abnormal residual counter (i) is incremented by one, and then it goes to Step 45. If normal, after resetting the abnormal residual counter (i) to zero, it goes to Step 45.

Embodiment 2

Normally, the abnormality of the GPS measurement (i) have a high probability to return to normal condition relatively in a short time. If the threshold is appropriately set, the probability in which the truly abnormal GPS measurement (i) is erroneously determined to be normal can be reduced to the extent which does not have problems for practical use, after the lapse of the set time of the abnormal residual counter (i), even by the determination method of Step 43 in FIG. 4 in which the GPS measurement (i) is forcibly set to normal.

However, when using a satellite having a low S/N or a high DOP, the abnormality of the GPS measurement (i) may not be for a short time. For this reason, after the lapse of the set time of the abnormal residual counter (i), when the GPS measurement (i) is forcibly set to normal, the truly abnormal GPS measurement (i) will be erroneously determined to be normal. In order to further improve the probability of this erroneous determination, a GPS reliability determination step is provided and the abnormal residual counter (i) is controlled according to the determination results. This implementation is shown in FIG. 5.

Figure 5:
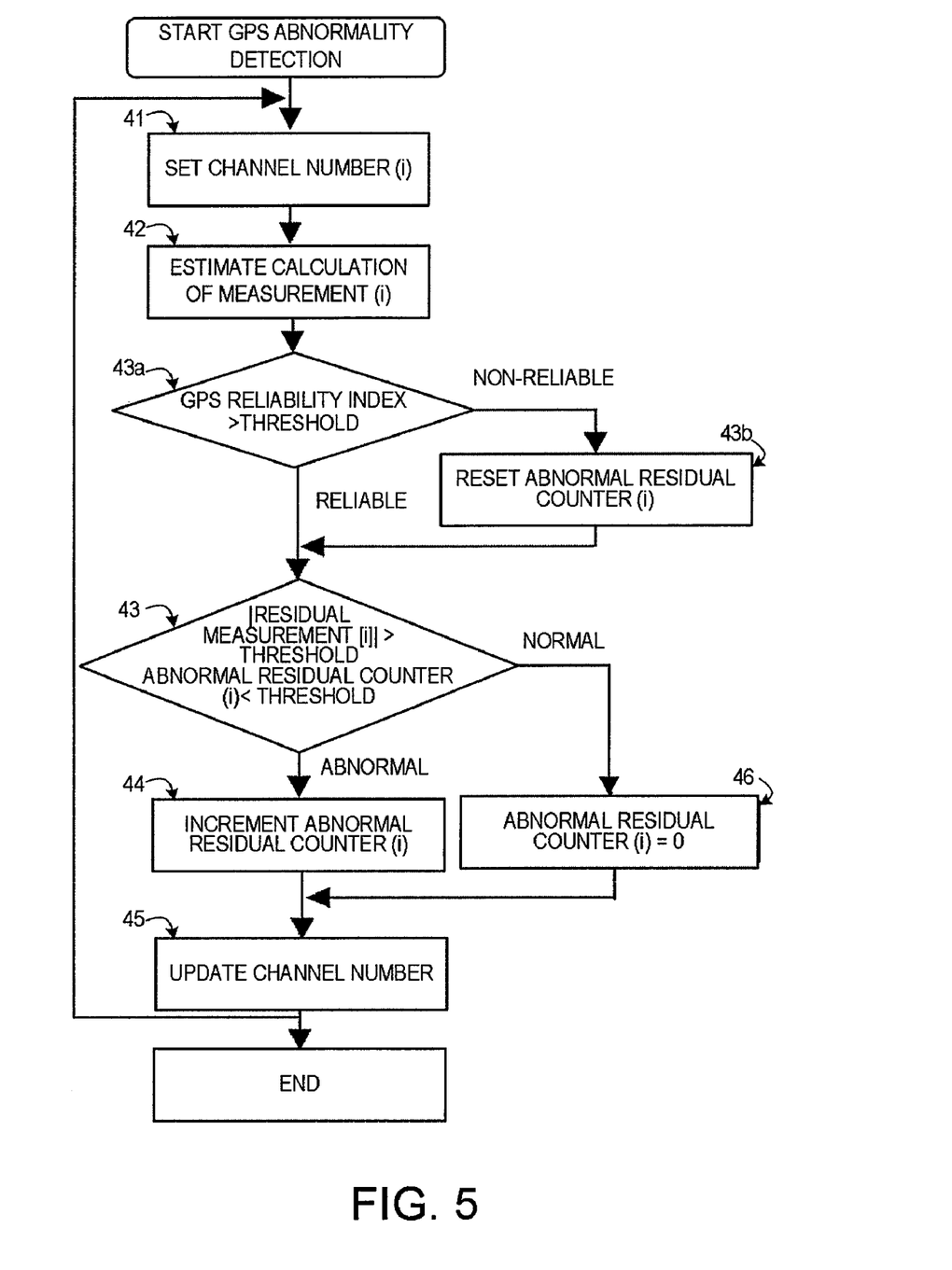
FIG. 5 is a diagram illustrating a process flow of Embodiment 2 according to the abnormal detection/determination of the present invention.

The difference between the configurations of FIGS. 5 and 4 is that processing steps of Steps 43a and 43b are added between Steps 42 and 43 of FIG. 4.

Step 43a is a processing step to determine a GPS reliability, where a reliability index is generated using a parameter which shows the quality of the outputs from the GPS receiver 2, and by comparing the reliability index with a predetermined threshold, the reliability of the measurements obtained from the outputs from the GPS receiver 2 is determined.

As a result, if not reliable, the abnormal residual counter (i) is reset to zero in Step 43b, and, if reliable, the reset of the abnormal residual counter (i) is not performed. Here, the reliability index may be set to an S/N or C/No of the received signals obtained from the outputs of the GPS receiver 2, or may be determined based on an inverse proportion value of the DOP value.

Thus, because, for the non-reliable GPS measurement (i), the abnormal residual counter (i) is reset to zero, even if determined to be abnormal by the determination with the GPS measurement difference (i) in the subsequent Step 43, the GPS measurement (i) will not forcibly be made to normal after the lapse of the set time of the abnormal residual counter (i). Therefore, the probability of determining that the truly abnormal GPS measurement (i) is accidentally deemed to be normal can be reduced.

Embodiment 3

In the configurations shown in FIGS. 4 and 5, instead of the abnormality determination by the GPS measurement difference (i), the abnormality determination of the GPS measurement difference (i) may be performed using a comparison difference between the position and/or the velocity of the moving body and the integrated position and/or the integrated velocity of the outputs from the integration processor 51 (i.e., a positional difference and/or a velocity difference).

A new difference signal may be generated by an OR combination or an AND combination of the GPS measurement difference (i) and the positional difference and/or the velocity difference, and the difference signals may be substituted by the GPS measurement difference (i) shown in Step 3 of FIG. 4 and Step 4 of FIG. 5.

What is claimed is:

1. A GPS compound device having a configuration including a GPS receiver, comprising:
   an integration processor for outputting a position, a velocity, and an azimuth of a moving body;
   an error estimator for estimating at least a velocity error and an azimuth error of the outputs from the integration processor based on at least an output from the GPS receiver and the outputs from the integration processor; and
   a GPS abnormality detector for detecting an abnormality of the output from the GPS receiver based on a difference between at least one of a pseudorange measurement and a Doppler frequency measurement of the output from the GPS receiver and an estimated value of the measurement,
   wherein, when the abnormality is detected by the GPS abnormality detector, an abnormal period is counted, and based on comparison of the count value with a predetermined threshold, the output from the GPS receiver is determined whether to be treated as abnormal or normal.

2. The GPS compound device of claim 1, wherein the GPS abnormality detector determines a reliability of the output from the GPS receiver, and when the GPS abnormality detector determines as non-reliable, the count of the abnormal period is stopped or reset.

3. The GPS compound device of claim 1, wherein the detection of abnormality by the GPS abnormality detector is performed by determining an abnormality of the output from the GPS receiver based on a difference between at least one of the position and the velocity of the output from the GPS receiver and at least one of the position and the velocity of the outputs from the integration processor.

4. The GPS compound device of claim 1, wherein the integration processor calculates the position, the velocity, and the azimuth of the moving body based on at least the position of the output from the GPS receiver, at least the output from an accelerometer for measuring an acceleration of the moving body in the traveling direction, and at least an output from a gyro sensor for measuring a rotation rate about an azimuth axis of the moving body.

5. The GPS compound device of claim 1, wherein the integration processor calculates the position, the velocity, and the azimuth of the moving body based on outputs from a velocity sensor for measuring at least a velocity of the moving body in the traveling direction and a gyro sensor for measuring at least a rotation about the azimuth axis of the moving body.

6. The GPS compound device of claim 1, further comprising a memory module for storing the output from the integration processor immediately before a power-off, wherein the data stored in the memory module is used as an initial value of the calculation by the integration processor at the time of a power-on.

* * * * *